US006950252B2

(12) United States Patent
Nishikawa et al.

(10) Patent No.: US 6,950,252 B2
(45) Date of Patent: Sep. 27, 2005

(54) MASTER CARRIER FOR MAGNETIC TRANSFER

(75) Inventors: Masakazu Nishikawa, Kanagawa-ken (JP); Tadashi Yasunaga, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 446 days.

(21) Appl. No.: 10/178,550

(22) Filed: Jun. 25, 2002

(65) Prior Publication Data

US 2003/0011912 A1 Jan. 16, 2003

(30) Foreign Application Priority Data

Jun. 25, 2001 (JP) ....................................... 2001-191315
Jun. 26, 2001 (JP) ....................................... 2001-193180
Sep. 28, 2001 (JP) ....................................... 2001-302235

(51) Int. Cl.[7] .................................................. G11B 5/86

(52) U.S. Cl. ....................... 360/17; 360/16; 428/694 T; 428/694 CS; 428/694 R

(58) Field of Search .................. 360/15–17; 428/694 R, 428/694 CS, 694 T, 694 GS, 69

(56) References Cited

U.S. PATENT DOCUMENTS 4,385,098 A 5/1983 Sugita et al.
5,593,723 A * 1/1997 Kitaori et al. .............. 427/127
5,733,370 A 3/1998 Chen et al.
6,347,016 B1 * 2/2002 Ishida et al. .................. 360/17

FOREIGN PATENT DOCUMENTS

| | | |
|---|---|---|
| EP | 1 156 480 A2 | 11/2001 |
| JP | 63-183623 | 7/1988 |
| JP | 10-40544 | 2/1998 |
| JP | 10-269566 | 10/1998 |
| JP | 2000-195048 | 7/2000 |
| JP | 2001-14665 | 1/2001 |

* cited by examiner

*Primary Examiner*—David Hudspeth
*Assistant Examiner*—Glenda P. Rodriguez
(74) *Attorney, Agent, or Firm*—Sughrue Mion, PLLC

(57) ABSTRACT

A master carrier for magnetic transfer is equipped with a substrate with a land/groove pattern of lands and grooves, and a magnetic layer formed on the land/groove pattern. The adhesion between the substrate and the magnetic layer is $1.2\times10^9$ N/m$^2$ or greater. A first oxygen concentration $D_o$ at the magnetic layer formed on the land is reduced gradually toward the direction of the depth of the substrate and is greater than a second oxygen concentration $D_h$ at the magnetic layer formed on the groove.

12 Claims, 2 Drawing Sheets

MASTER CARRIER FOR MAGNETIC TRANSFER

BACKGROUND OF THE INVENTION

1. Field of the Invention

The present invention relates to a master carrier for magnetic transfer that carries information that is transferred magnetically to a slave medium.

2. Description of the Related Art

With an increase in information quantity, there is demand for a magnetic recording medium that has high memory capacity, is low in cost and capable of high-speed access to a desired block of data. As an example of such a magnetic recording medium, there is known a high recording density magnetic medium (magnetic disk medium) that is employed in a hard disk drive or flexible disk drive. To realize the high memory capacity, servo tracking technology has played an important role. In the servo tracking technology, the narrow data tracks are scanned accurately with a magnetic head to generate signals at a high signal-to-noise ratio (S/N ratio). To perform the servo tracking, a servo tracking signal, an address information signal, a clock signal, etc., are preformatted in the disk at predetermined intervals.

As a method for performing the pre-formatting accurately and efficiently, a magnetic transfer method of magnetically transferring information (such as a servo signal, etc.) carried by a master carrier to a magnetic recording medium has been disclosed, for example, in Japanese Unexamined Patent Publication Nos. 63(1988)-183623, 10(1998)-40544, and 10(1998) -269566.

In the above magnetic transfer method, the master carrier has a pattern of protrusions provided with a magnetic layer on the surfaces thereof corresponding to information that is transferred to a magnetic recording medium (slave medium) such as a magnetic disk medium, and is brought into close contact with the slave medium. In this state, a magnetic field for magnetic transfer (hereinafter referred to as a transfer field) is applied so that a magnetization pattern corresponding to the information (for example, a servo signal) carried by the master carrier is transferred to the slave medium. Because magnetic recording can be performed statically without changing the relative position between the master carrier and the slave medium, accurate pre-formatting can be performed and the time required for pre-formatting is extremely short.

The master carrier that is used for magnetic transfer has a land/groove pattern, which is formed from a magnetic material by performing processes, such as photolithography, sputtering, etching, etc., on a silicon substrate, a glass substrate, or the like.

It is also possible to generate the aforementioned master carrier by utilizing lithography, which is used for integrated circuit (IC) fabrication, or a stamper technique, which is for optical disk stamper generation.

To enhance the quality of transfer in the aforementioned magnetic transfer, it is extremely important to bring the master carrier and the slave medium into close contact with each other without any gap. If the contact between the two is deficient, then regions where magnetic transfer is not performed will occur. If magnetic transfer is not performed, signal dropouts occur in the magnetic information transferred to the slave medium and therefore the signal quality is reduced. In the case where a signal recorded is a servo signal, the tracking function cannot be sufficiently obtained, and consequently, there is a problem that the reliability will be reduced.

In the aforementioned magnetic transfer, one or two flat master carriers are brought into close contact with one or both sides of a slave medium. Because of this, dust particles must not exist at the contact portion between the master carrier and the slave medium. If dust particles are present on the contact portion, stable magnetic transfer cannot be performed and there is a possibility that the master carrier or slave medium itself will be damaged.

In the magnetic transfer, relatively high pressure is applied on the master carrier and the slave medium to perform entire-surface contact. Because of this, if magnetic transfer is repeated a large number of times, and the number of contacts is increased, the magnetic layer formed on the substrate of the master carrier will be chipped in the magnetic transfer step. If the fragments of the chipped magnetic layer are present on the contact portion between the master carrier and the slave medium, they can reduce the quantity of transferred signals and can be the cause of deterioration in the durability of the master carrier.

The cause of the separation, etc., of the magnetic layer of the master carrier lies in a high chemical affinity between the magnetic layer of the master carrier and the magnetic layer, protective layer, and lubricant layer of the slave medium, the fragility of the magnetic layer itself with respect to external force, and so on. That is, when the master carrier and the slave medium are separated after magnetic transfer is performed with the master carrier held in close contact with the slave medium, force acts on the magnetic layer of the master carrier in a direction opposite to the substrate of the master carrier. Because of the high chemical affinity between the magnetic layer of the master carrier and the lubricant layer, protective layer, and magnetic layer of the/slave medium, if the force in the opposite direction is repeatedly applied on the magnetic layer, the separation of the magnetic layer from the master carrier occurs. In addition, in repeated use, the master carrier undergoes external force such as shock, etc., and therefore part of the magnetic layer is sometimes separated or chipped.

As a method for reducing the separation, etc., of the magnetic layer of the master carrier, a method of forming a diamond-like carbon (DLC) film on the magnetic layer surface of the master carrier, or a method of further forming a lubricant layer on the uppermost layer of the master carrier which makes contact with the slave medium, is disclosed in Japanese Unexamined Patent Publication No. 2000-195048 or 2001-14665. By forming the DLC film or lubricant layer, the separation, etc., of the magnetic layer of the master carrier are reduced to some degree and the durability of the master carrier is enhanced. However, these methods cannot prevent the separation, etc., of the magnetic layer completely. In addition, in the conventional magnetic layer, the size of the fragments of a separated or chipped magnetic layer, caused by separation, etc., often becomes great. Therefore, if separation occurs, poor magnetic transfer is caused by the separated or chipped magnetic layer and therefore transfer performance is deteriorated.

In the case where the separation, etc., of the magnetic layer occurs over a wide range, the number of signal dropouts exceeds an allowable range, and consequently, the use of the master carrier cannot be continued. As the master carrier is expensive, the number of slave media to which magnetic transfer is performed by a single master carrier is extremely important in reducing the manufacturing cost.

On the other hand, even in the case where the separation, etc., of the magnetic layer occurs, if the separated or chipped fragments are small, the influences such as transfer signal dropout and deficient close contact property which lead to poor magnetic transfer is slight. In this case, there is no reduction in the quantity of magnetic transfer and the use of the master carrier can be continued.

SUMMARY OF THE INVENTION

The present invention has been made in view of the circumstances mentioned above. Accordingly, it is the primary object of the present invention to provide a master carrier for magnetic transfer that prevents poor transfer, with enhanced durability.

To achieve this end, there is provided a first master carrier for magnetic transfer, comprising a substrate with a land/groove pattern comprising lands and grooves, and a magnetic layer formed on the land/groove pattern. The adhesion force between the substrate and the magnetic layer is $1.2\times10^9$ N/m$^2$ or greater. In addition, a first oxygen concentration $D_o$ at the magnetic layer formed on the land is reduced as the distance from said surface becomes greater, so that it is greater than a second oxygen concentration $D_h$ at the magnetic layer formed on the groove.

In the first master carrier of the present invention, a surface on the magnetic layer side of the substrate is oxidized. In addition, a ratio of the first oxygen concentration $D_o$ and the second oxygen concentration $D_h$, $D_h/D_o$, is in the range of 0.05 to 0.8. Furthermore, an average oxygen concentration in the depth direction from the first oxygen concentration to the second oxygen concentration is 15 at % (atomic percent) or less.

If the adhesion between the substrate and the magnetic layer is $1.2\times10^9$ N/m$^2$ or greater, there is no possibility that the magnetic layer will be chipped, even if the master carrier and the slave medium are repeatedly contacted with each other. The inventors have investigated various materials and found that a ceramic material is very effective in enhancing the adhesion between itself and the magnetic layer. However, a ceramic material has great internal stress. If a ceramic layer is provided on the substrate surface, the adhesion between the magnetic layer and the ceramic layer is enhanced, but there is a possibility that between the ceramic layer and the substrate, film separation will take place due to the internal stress in the ceramic layer. If the substrate surface itself is oxidized, or the same crystal system oxide as the ceramic layer is formed, the adhesion between the ceramic layer and the substrate can be considerably improved. In addition, if an oxygen concentration at the substrate surface is high, the ceramic layer becomes thin and therefore film separation due to internal stress can be prevented.

In accordance with the present invention, there is provided a second master carrier for magnetic transfer, comprising a substrate, and a pattern, provided on the substrate, which comprises a plurality of lands having a magnetic layer on at least the surfaces thereof. It is preferable that at least a surface of the magnetic layer be oxidized, nitrified, and/or carbonized.

The expression "at least a surface of the magnetic layer is oxidized, nitrified, and/or carbonized" means that the magnetic layer may have oxidized, nitrified, and carbonized portions at the same time, or may have one or two of the oxidized, nitrified, and carbonized portions.

It is further preferable that the entire area of the magnetic layer be oxidized, nitrified, and/or carbonized.

In the second master carrier of the present invention, the quantity of oxidization, nitrification, and/or carbonization on the surface side of the magnetic layer is greater than that of oxidization, nitrification, and/or carbonization on the substrate side of the magnetic layer. That is, the concentration of oxygen, nitrogen, and/or carbon on the magnetic layer surface side is greater than that of oxygen, nitrogen, and/or carbon on the substrate side of the magnetic layer. In this case, the quantity of oxidization, nitrification, and/or carbonization on the magnetic layer surface side is made greater than the average quantity of oxidization, nitrification, and/or carbonization for the entire magnetic layer.

In the second master carrier of the present invention, the sum total of oxygen, nitrogen, and/or carbon in the oxidized portion, nitrified portion, and/or carbonized portion is in the range of 0.5 to 40at % (atomic percent) with respect to the quantity of all elements in the magnetic layer. It is preferable that it be in the range of 1 to 30 at %.

According to the master carrier of the present invention, the adhesion between the substrate and the magnetic layer is made higher, and the oxygen concentration in the substrate is made higher at the surface than at the interior. Therefore, even if the master carrier and the slave medium are contacted at high pressure during magnetic transfer, there is no possibility that the magnetic layer will be chipped. As a result, there are no signal dropouts due to poor transfer caused by the fragments of a chipped magnetic layer. In addition, a reduction in the quality of transferred signals can be prevented, the durability of the master carrier can be enhanced, and the number of transfers can be increased.

In the case where a ceramic layer is interposed between the substrate and the magnetic layer to enhance the adhesion between the ceramic layer and the magnetic layer, the substrate surface itself is oxidized, or the same crystal system oxide as the ceramic layer is formed. Because of this, the oxygen concentration at the surface portion is enhanced and the ceramic layer can be made thinner. As a result, film separation due to internal stress can be prevented.

In the master carrier with a pattern consisting of a plurality of lands having a magnetic layer on the surfaces thereof, at least a surface of the magnetic layer is oxidized, nitrified, and/or carbonized. Because of this, the chemical affinity between the magnetic layer of the master carrier and the lubricant layer, protective layer, and magnetic layer of the slave medium becomes small, compared with a conventional master carrier.

An oxidized, nitrified, or carbonized magnetic layer becomes tougher compared with a magnetic layer not oxidized, nitrified, and carbonized. Since a portion or all of the magnetic layer of the master carrier of the present invention is oxidized, nitrified, or carbonized, the magnetic layer itself becomes tougher compared with a conventional one and therefore has high resistance to external force.

Even if an oxidized, nitrified, or carbonized magnetic layer is partially separated or chipped, the fragments from the separated or chipped magnetic layer are small in cohesive force and size and therefore have no adverse effect on transfer quality. That is, since the separated fragments from a conventional magnetic layer are large in size, transfer quality is severely degraded. On the other hand, the separated fragments from the magnetic layer of the master carrier of the present invention are small in size, so transfer quality degradation can be prevented.

Because of the advantages mentioned above, the durability of the master carrier of the present invention is enhanced and the lifetime thereof is prolonged. As a result, the manufacturing cost for preformatted magnetic recording media can be reduced.

In the master carrier of the present invention, the quantity of oxidization, nitrification, and/or carbonization on the surface side of the magnetic layer is made greater than that of oxidization, nitrification, and/or carbonization on the substrate side of the magnetic layer. Therefore, the master carrier of the present invention is capable of effectively achieving an enhancement in the durability of the surface and a reduction in the chemical affinity between the magnetic layer of the master carrier and the lubricant layer, protective layer, and magnetic layer of the slave medium, while preventing an increase in the quantity of oxidization, nitrification, and/or carbonization of the entire magnetic layer.

If the sum total of oxygen, nitrogen, and/or carbon in the oxidized portion, nitrified portion, and/or carbonized portion is in the range of 0.5 to 40 at % (atomic percent) with respect to the quantity of all elements in the magnetic layer, the aforementioned advantages can be sufficiently obtained and a magnetic layer which has no adverse effect on the magnetic characteristic can be obtained.

BRIEF DESCRIPTION OF THE DRAWINGS

The present invention will be described in further detail with reference to the accompanying drawings wherein.

DESCRIPTION OF THE PREFERRED EMBODIMENTS

Embodiments of the present invention will hereinafter be described in detail with reference to the attached drawings.

FIG. 1 shows the steps of a magnetic transfer method in which a master carrier is employed according to a first embodiment of the present invention. As shown in the figure, the magnetic transfer method adopts longitudinal recording. Note in FIG. 1 that the dimensions of each part are shown at ratios differing from the actual dimensions.

Figure 1A:
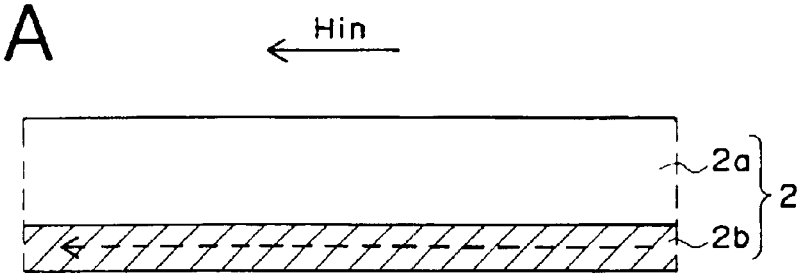
FIGS. 1A through 1C are diagrams showing the steps of a magnetic transfer method which uses a master carrier constructed according to a first embodiment of the present invention.
Figure 1B:
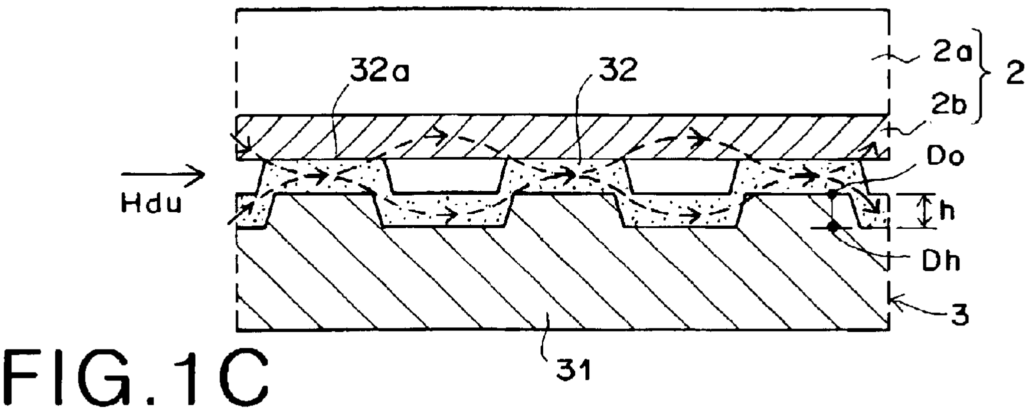
Figure 1C:
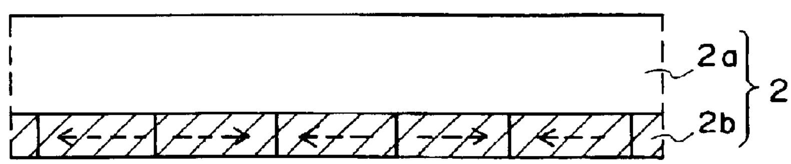

An overview of the magnetic transfer method adopting longitudinal recording will be given. As shown in FIG. 1A, an initializing field ($H_{in}$) is first applied to a slave medium 2 in one direction along the direction of the data track to perform initial magnetization. The slave medium 2 is equipped with a substrate 2*a* and a magnetic layer (magnetic recording surface) 2*b*. Thereafter, as shown in FIG. 1B, the magnetic recording surface of the slave medium 2, and the top surface of the land pattern 32*a* of the information carrying surface of a master carrier 3, are brought into close contact with each other. The land pattern 32*a* of the information carrying surface is formed by depositing a magnetic layer 32 on the microscopic land/groove pattern on the substrate 31 of the master carrier 3. In the state of the close contact, a magnetic field ($H_{du}$) for magnetic transfer (hereinafter referred to as a transfer field ($H_{du}$)) is applied in the opposite direction from the direction of the initializing field ($H_{in}$)to perform magnetic transfer. The transfer field ($H_{du}$) is passed through the land pattern 32*a* of the magnetic layer 32, so that the magnetization of the land pattern 32*a* is not reversed and the magnetization in each groove is reversed. Therefore, as shown in FIG. 1C, a magnetization pattern is transferred to the data track of the slave medium 2. The magnetization pattern corresponds to a pattern, formed by both the lands 32*a* of the magnetic layer 32 of the information carrying surface of the master carrier 3 and the grooves between the lands 32*a*.

The master carrier 3 is formed into the shape of a disk and has an information carrying surface on one side thereof. The information carrying surface is formed from the magnetic layer 32 and has a microscopic land/groove pattern corresponding to a servo signal. The bottom surface, opposite to the information carrying surface, of the master carrier 3 is held by a holder (not shown) and is brought into close contact with the slave medium 2. Although only one side 2*b* of the slave medium 2 is shown in FIG. 1, the slave medium 2 may have magnetic layers on both sides thereof. In this case there are single-sided serial transfer and double-sided simultaneous transfer. The single-sided serial transfer is performed with the master carrier 3 brought into close contact with one side of the slave medium 2. The double-sided simultaneous transfer is performed with two master carriers 3 brought into close contact with both sides of the slave medium 2.

In the master carrier 3, the adhesion between the substrate 31 and the magnetic layer 3 is $1\times10^9$ N/m$^2$ or greater. The surface portion of the substrate 31 is oxidized so that the oxygen concentration is gradually reduced from the surface in the direction of the depth of the substrate 31. That is, a relation of $D_o>D_h$ is obtained in which $D_o$ represents the oxygen concentration at the land face in the land/groove pattern of the substrate 31 and $D_h$ represents the oxygen concentration at a depth of h measured from the land face, i.e., the oxygen concentration at the groove face. In addition, the oxidation process is performed so that the ratio of $D_h/D_o$ is in the range of 0.05 to 0.8. Furthermore, the oxidation process is performed so that the average oxygen concentration from the land face of the substrate 31 to the depth of h is 15 at % (atomic percent) or less.

The aforementioned oxidation process can adopt ion implantation, a dry oxidation process, a wet oxidation process, etc. For example, by performing reverse sputtering on the surface of the substrate 31 and then exposing the surface to a high-concentration ozone atmosphere for a fixed time, the surface portion is partially oxidized.

Since the oxygen concentration becomes high by the oxidation of the surface portion of the substrate 31 of the master carrier 3, the adhesion between the substrate 31 and the magnetic layer 32 becomes $1\times10^9$ N/m$^2$ or greater. Therefore, even if magnetic transfer is repeatedly performed, there is no possibility that the magnetic layer 32 will be chipped. As a result, there are no dust particles, the quality of transferred signals is ensured, and the durability of the master carrier 3 is enhanced.

Note that in the case where the land/groove pattern on the substrate 31 of the master carrier 3 is a negative land/groove pattern opposite the positive land/groove pattern shown in FIG. 1, a similar magnetization pattern can be transferred and recorded by applying the initializing field ($H_{in}$) and the transfer field ($H_{du}$) in directions opposite to the aforementioned directions.

It is preferable that the magnetic layer 32 be provided with a protective coating such as a diamond-like carbon (DLC) coating, etc. It may be provided with a lubricant layer. It is further preferable that the protective coating consist of a DLC coating of 5 to 30 nm and a lubricant layer. Furthermore, between the magnetic layer 32 and the protective coating, a reinforcement layer such as a silicon (Si) layer may be provided to reinforce the contact therebetween. The lubricant layer improves durability degradation, such as scores due to friction, which occurs in correcting for a shift that occurs when the magnetic layer 32 and the slave medium 2 are brought into contact with each other.

The substrate 31 of the master carrier 3 uses nickel (Ni), silicon (Si), aluminum, alloys, etc. The land/groove pattern on the substrate 31 is formed by a stamper generation method, etc.

In the stamper generation method, a uniform photoresist film is first formed on the smooth surface of a glass plate (or a quartz plate). Then, while the glass plate is being rotated, a laser light beam (or an electron beam) modulated according to a servo signal is irradiated to expose predetermined patterns (e.g., patterns corresponding to a servo signal) at positions on the entire photoresist film that correspond to the frames of the data tracks. Next, the photoresist film is developed to remove the exposed portions, and an original disk with a land/groove shape consisting of the photoresist film is obtained. Next, based on the land/groove pattern on the surface of the original disk, the disk surface is plated (or electrocast) to generate a nickel (Ni) substrate having a positive land/groove pattern. The substrate is separated from the original disk. After this substrate is oxidized, a magnetic layer and a protective coating are formed on the land/groove pattern of the substrate. In this manner a master carrier is generated.

In addition, by plating the aforementioned original disk to generate a second original plate and then plating the second original disk, a substrate with a negative land/groove pattern may be generated. Furthermore, by plating the second original disk (or hardening a resin solution applied to the second original disk) to generate a third original disk and then plating the third original disk, a substrate with a positive land/groove pattern may be formed.

On the other hand, a photoresist pattern is formed on the aforementioned glass plate; then, etching is performed to form grooves in the glass plate; the photoresist is removed to obtain an original disk; and thereafter, a substrate may be formed in the aforementioned manner.

It is preferable that the groove depth (or land height) in the land/groove pattern of the substrate 31 be in the range of 80 to 800 nm. It is further preferable that it be in the range of 100 to 600 nm.

The magnetic layer 32 is formed by forming a thin film of magnetic material on the substrate 31 with a vacuum vapor deposition method (vacuum evaporation, sputtering, ion plating, etc.), a plating method, etc. The magnetic material for the magnetic layer 32 can employ cobalt (Co), alloys with Co (CoNi, CoNiZr, CoNbTaZr, etc.), iron (Fe), alloys with Fe (FeCo, FeCoNi, FeNiMo, FeAlSi, FeAl, FeTaN, etc.), nickel (Ni), and alloys with Ni (NiFe, etc.). Particularly, FeCo and FeCoNi are preferred. It is preferable that the thickness of the magnetic layer 32 be in the range of 50 to 500 nm. The range of 100 to 400 nm is further preferable.

In the case of perpendicular recording, approximately the same master carrier 3 as the aforementioned longitudinal recording is used. In perpendicular recording, initial DC magnetization is performed so that the slave medium 2 is magnetized in one direction perpendicular to the slave medium plane. With the slave medium 2 and the master carrier 3 held in close contact with each other, a transfer field is applied in the opposite direction from the direction of the initial magnetization direction to perform magnetic transfer. Since the transfer field is passed through the magnetic layer 32 of the land pattern 32*a* of the master carrier 3, the perpendicular magnetization of the land pattern 32*a* is reversed. In this way, a magnetization pattern corresponding to the land/groove pattern of the substrate 31 of the master carrier 3 can be recorded on the slave medium 2.

In the case of longitudinal recording, the magnetic-field generation means for applying an initializing field and a transfer field is constructed of vertically spaced ring electromagnets that have a coil wound on a core having a gap which extends in the radial direction of the slave medium 2. With the vertically spaced ring electromagnets, transfer fields generated in the same direction are applied parallel to the data track direction. While the slave medium 2 and the master carrier 3 are being rotated, transfer fields are applied by the magnetic field generation means. The magnetic field generation means may be provided so that it is rotatable. The magnetic field generation means may be arranged only on one side. Alternatively, the magnetic field generation means may be constructed of a single permanent magnet arranged on one side or two permanent magnets arranged on both sides.

The magnetic field generation means in the case of perpendicular recording is constructed of electromagnets or permanent magnets of opposite polarities, which are disposed above and below a contact body consisting of the slave medium 2 and the master carrier 3. The magnetic field generation means generates a magnetic field in a perpendicular direction and applies it on the contact body. In the case where the magnetic field generation means applies a magnetic field on a portion of the slave medium 2, magnetic transfer is performed on the entire surface by moving either the contact body or the magnetic field.

Figure 2:
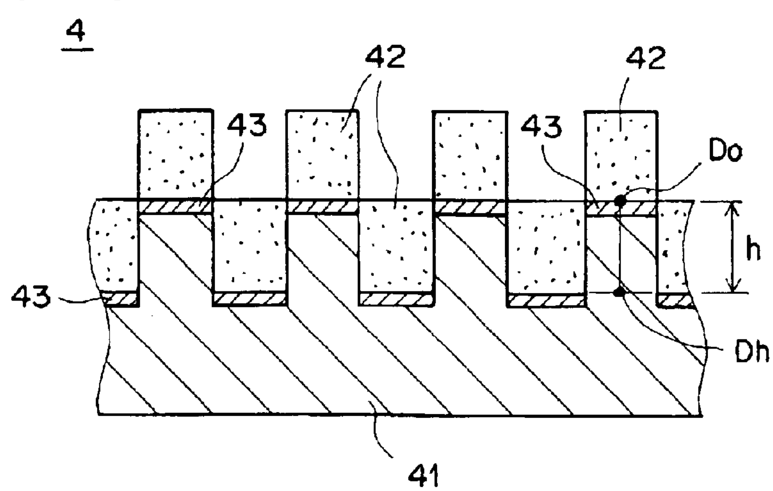
FIG. 2 is a sectional view of a master carrier according to a second embodiment of the present invention.

FIG. 2 is a sectional view of a master carrier 4 according to a second embodiment of the present invention. In the second embodiment, the master carrier 4 is made up of a substrate 41 having a land/groove pattern, a thin ceramic layer 43 formed on the land/groove pattern of the substrate 41, and a magnetic layer 42 deposited on the ceramic layer 43.

In the illustrated example, the ceramic layer 43 and the magnetic layer 42 are formed to predetermined thicknesses by sputtering, etc., and they are deposited on the lands and grooves of the land/groove pattern of the substrate 41. The adhesion between the ceramic layer 43 and the magnetic layer 42 is high. To enhance the adhesion between the ceramic layer 43 and the surface of the substrate 41, the surface of the substrate 41 is oxidized the same as the aforementioned case. Therefore, the surface portion is oxidized, or the same crystal system oxide as the ceramic layer 43 is formed.

In this manner, the adhesion between the magnetic layer 42 and the ceramic layer 43, and the adhesion between the ceramic layer 43 and the substrate 41, become $1\times10^9$ N/m$^2$ or greater. As with the first embodiment, the oxygen concentration $D_o$ at the land face in the land/groove pattern of the substrate 41, including the ceramic layer 43, is gradually reduced from the land face in the direction of the depth of the substrate 31. The oxygen concentration $D_h$ at a depth of h measured from the land face (or a height h measured from the groove face in the land/groove pattern) is in a relation of $D_o>D_h$. The ratio of $D_h/D_o$ is in the range of 0.05 to 0.8. Furthermore, the average oxygen concentration in the direction of the depth from the land face of the substrate 41 to the depth of h (groove face) is 15 at % (atomic percent) or less.

The ceramic layer 43 enhances the adhesion between itself and the magnetic layer 42. On the other hand, the ceramic layer 43 has great internal stress, so there is a possibility that film separation will take place between the ceramic layer 43 and the substrate 41. However, the adhesion between the ceramic layer 43 and the substrate 41 has been considerably enhanced by oxidizing the surface of the substrate 41, or forming the same crystal system oxide as the ceramic layer 43. In addition, by making the oxygen concentration of the surface of the substrate 41 higher, the ceramic layer 43 can be made thinner and therefore film separation due to internal stress can be further prevented.

Figure 3A:
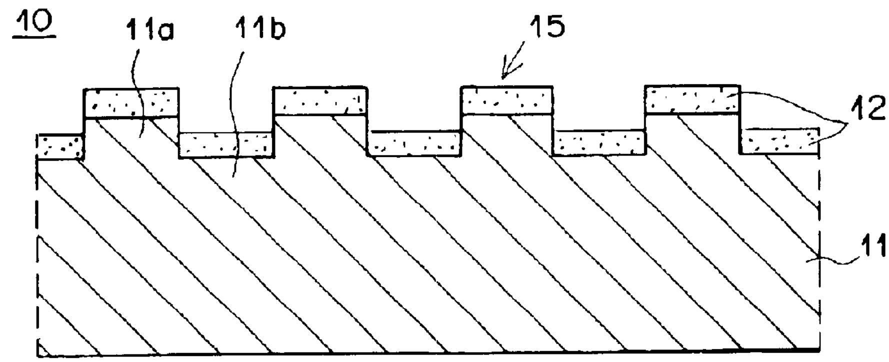
FIGS. 3A and 3B are sectional views of a master carrier according to a third embodiment of the present invention.

FIG. 3 is a sectional view of a master carrier 10 according to a third embodiment of the present invention. As shown in FIG. 3A, the master carrier 10 in the third embodiment is equipped with a substrate 11 and a magnetic layer 12. The substrate 11 has a land pattern on the surface thereof, the land pattern corresponding to information (e.g., a servo signal) that is to be transferred. The magnetic layer 12 is formed on both the lands 11*a* in the land pattern and grooves 11*b* of the substrate 11. Because the magnetic layer 12 is formed on the land pattern of the substrate 11, the master carrier 10 is equipped with a pattern of lands 15 having a magnetic layer on the surface. Note that the master carrier 10 is not limited to this embodiment. For example, the magnetic layer may be formed only on the lands 11*a*. Furthermore, a pattern of lands consisting of a magnetic layer may be formed on a flat substrate. That is, the lands themselves may be formed from a magnetic layer.

The magnetic layer 12 is partially oxidized, nitrified, and/or carbonized. The magnetic layer 12 is formed so that the quantity of oxidation, nitrification, and carbonization is reduced gradually from the surface toward the substrate 11. In the third embodiment, the magnetic layer 12 undergoes only an oxidation process as an example.

Figure 3B:
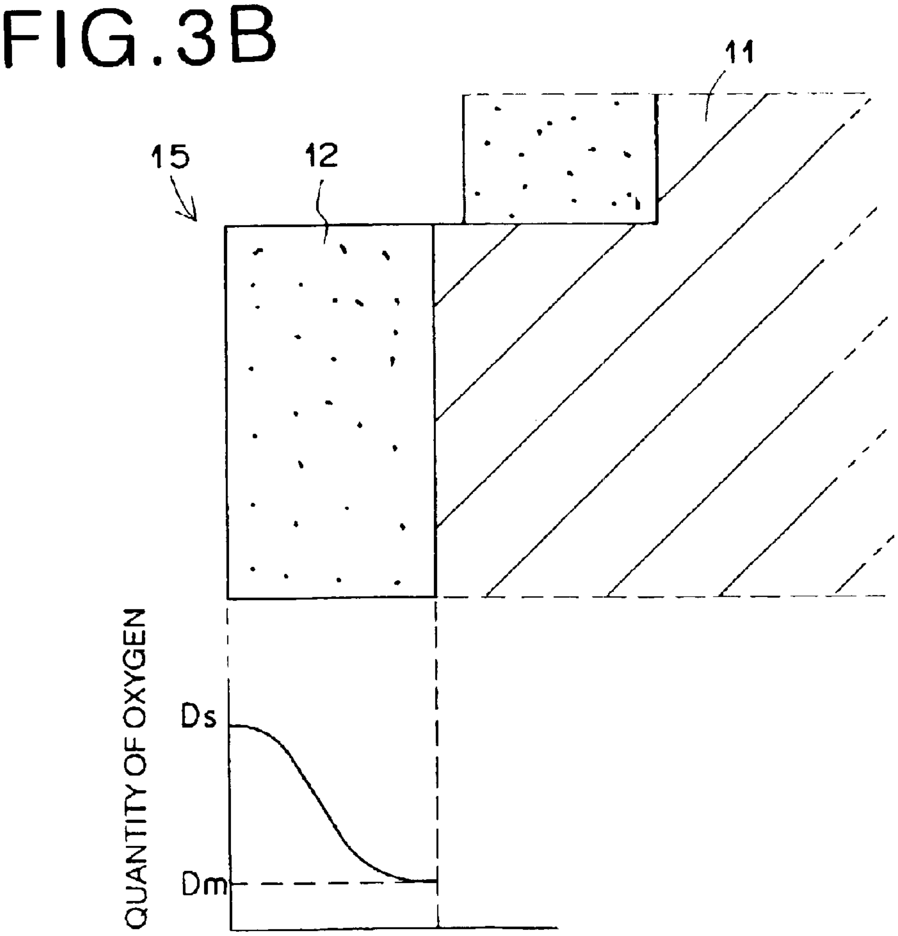

FIG. 3B shows the oxidation-quantity distribution in the direction of the film thickness of the magnetic layer 12. In the figure, the direction of the film thickness of the magnetic layer 12 of the master carrier 10 is represented as the horizontal axis. As shown in the figure, the oxygen quantity Ds on the surface side of the magnetic layer 12 is greater than the oxygen quantity Dm on the substrate side, and is reduced gradually from the surface side toward the substrate side. It is preferable that the total oxygen quantity with respect to all the elements of the magnetic layer 12 be in the range of 0.5 to 40 at % (atomic percent) and further preferable that it be in the range of 1 to 30 at %. In the case where the magnetic layer 12 has not only an oxidized portion but also nitrified and carbonized portions, the sum total of the oxygen quantity, the nitrogen quantity, and the carbon quantity is in the aforementioned ranges with respect to all the elements of the magnetic layer 12.

The formation of the magnetic layer 12 onto the substrate 11 having a land pattern can be performed by forming a thin layer of magnetic material with a vacuum vapor deposition such as sputtering, ion plating, etc. If reactive gas is introduced during formation of the magnetic layer 12, it can have an oxidized portion, a nitrified portion, and/or a carbonized portion. For instance, if an oxidizing gas (e.g., oxygen) is added to argon (Ar), and reactive sputtering is performed, the magnetic layer 12 with an oxidized portion can be formed. The magnetic layer 12 can be nitrified by adding nitrogen to Ar. Furthermore, it can be carbonized by adding hydrocarbon such as methane to Ar. Note that the magnetic layer 12 can easily have a distribution for an oxygen quantity in the direction of the film thickness by adjusting the amount of gas during formation of the magnetic layer 12.

Alternatively, after a magnetic layer is formed by an ordinary method without employing reactive gas, the magnetic layer may be partially oxidized, nitrified, and/or carbonized. In this case, dry or wet oxidation, nitrification, carbonization methods, as well as ion implantation, can be employed. For example, if the surface of a magnetic layer formed by sputter deposition is cleaned by reverse sputtering and exposed to a high-concentration ion atmosphere for a fixed time, a region near the surface portion (e.g., a region 10 to 30 nm away from the surface) can be partially oxidized easily. Furthermore, film formation by reactive sputtering may be combined with the oxidation, nitrification, and carbonization processes after film formation.

In the master carrier for magnetic transfer of the third embodiment, the magnetic layer has been oxidized, nitrified, and/or carbonized. Because of this, the magnetic layer is tough and robust to external force such as shock, etc, compared with a conventional one. As the chemical affinity between the slave medium and the magnetic layer is small, the separation of the magnetic layer from the master carrier can be prevented when the slave medium and the master carrier are separated from each other. Thus, the master carrier of the present invention can be repeatedly used in a large number of magnetic recording media, compared with a convention alone. In addition, even if separation, etc., of the magnetic layer on the lands in the land/groove pattern take place, the fragments of the chipped magnetic layer are small, and therefore, the master carrier can be used without having an adverse effect on transfer quality. Thus, the durability of the master carrier for magnetic transfer is enhanced and the lifetime can be prolonged. As a result, the manufacturing cost for preformatted magnetic recording media can be reduced.

Now, a description will be given of the results obtained from the experiment of durability after magnetic transfer has been repeatedly performed on embodiments of the master carrier of the present invention.

Initially, a description will be given of the generation of master carriers used as embodiments.

As the substrates of the master carriers of the embodiments, Ni substrates were generated by a stamper generation method. More specifically, radial lines with a bit length of 0.5 $\mu$m are arranged between the disk center and a radial position of 20 to 40 mm. The track width and pitch are 10 $\mu$m and 12 $\mu$m respectively.

The oxidation process for the substrate surface was performed by exposing the surface of the Ni substrate to an oxygen plasma. In the oxidation process, a mixed gas of argon and oxygen was used and the sputtering pressure was set to 1.16 Pa (8.7 mTorr) for argon and oxygen.

Thereafter, a FeCo 30 at % magnetic layer was formed on the surface-processed Ni substrate. The magnetic layer has a thickness of 200 nm. The Ar sputtering pressure was $1.44\times10^{-1}$ Pa (1.08 mTorr).

Embodiments 1 to 3 and comparative examples 1, 2 were generated by varying the exposure time, etc., so that they differ from one another in the relation of the oxygen concentration $D_o$ at the land face of the land/groove pattern and the oxygen concentration $D_h$ at the groove face, and also differ in the average oxygen concentration (at %) from the land face to the groove face.

In the master carrier of the embodiment 1, the substrate was processed so that the ratio of the oxygen concentration at the land face and the oxygen concentration at the groove face becomes $D_h/D_o=0.05$, i.e., $D_o>D_h$ and the average oxygen concentration becomes 3 at %. The magnetic layer was formed on the substrate so that the adhesion therebetween becomes $1.2\times10^9$ N/m$^2$.

In the master carrier of the embodiment 2, the substrate was processed so that the oxygen concentration ratio becomes $D_h/D_o$=0.7, i.e., $D_o>D_h$ and the average oxygen concentration becomes 10 at %. The magnetic layer was formed on the substrate so that the adhesion therebetween becomes $1.2\times10^9$ N/m$^2$.

In the master carrier of the embodiment 3, the substrate was processed so that the oxygen concentration ratio becomes $D_h/D_o$=0.7, i.e., $D_o>D_h$ and the average oxygen concentration becomes 17 at %. The magnetic layer was formed on the substrate so that the adhesion therebetween becomes $1.2\times10^9$ N/m$^2$.

In the master carrier of the comparative example 1, the same substrate as the embodiment 1 was employed. The magnetic layer was formed on the substrate so that the adhesion therebetween becomes $8.8\times10^8$ N/m$^2$.

In the master carrier of the comparative example 2, the substrate was processed so that the oxygen concentration ratio becomes $D_h/D_o$=1, i.e., $D_o=D_h$ and the average oxygen concentration becomes 100 at %. The magnetic layer was formed on the substrate so that the adhesion therebetween becomes $1.2\times10^9$ N/m$^2$.

As the slave medium, a 3.5" disk-shaped magnetic recording medium was made by a sputtering apparatus device (Shibaura Mechatronics: S-50S sputter apparatus). That is, in the device, the pressure was reduced to $1.33\times10^{-5}$ Pa ($1\times10^{-4}$ mTorr) at room temperature. Then, argon (Ar) was introduced and the pressure was increased to 0.4 Pa (3 mTorr). Under these conditions, an aluminum plate was heated to 200° C., and a CrTi layer of thickness 60 nm and a CoCrPt layer of thickness 25 nm were sequentially stacked. The saturated magnetization Ms is 5.7 T (4500 Gauss), and the coercive field ($H_{cs}$) is 199 kA/m (2500 Oe).

Electromagnets were arranged so that the peak magnetic field intensity becomes 398 KA/m (5000 Oe) equal to twice the coercive field ($H_{cs}$) of the slave medium. In this state, the slave medium was magnetized in one direction to perform initial DC magnetization. After the initial DC magnetization, the slave medium and the master carrier were brought into close contact with each other. In this state, a magnetic field of 199 kA/m (2500 Oe) was applied and magnetic transfer was performed.

The durability of the master carrier was evaluated as follows. That is, the contact pressure between the master carrier and the slave medium was set to 0.49 MPa (5.0 kgf/cm$^2$) and they were contacted and separated 1000 times. Thereafter, the master carrier surface was observed at a 480× magnification ratio by a differential interference microscope at 50 random visual fields. If the number of worn or cracked portions in the magnetic layer within the 50 visual fields is 2 or less, it is evaluated as a good state (○) in which good magnetic transfer can be performed. If it is 3 to 5, it is evaluated as a fair state (Δ) in which magnetic transfer can be performed. If it is 5 or greater, it is evaluated as a poor state (×) in which accuracy of transfer becomes poor.

Magnetic transfer was performed on the aforementioned medium using the master carriers of the embodiments 1 to 3 and comparative examples 1 and 2, and the durability was evaluated. The results are listed in Table 1.

TABLE 1

| | Adhesion between the substrate and the soft magnetic layer (N/m$^2$) | Dh/Do | Average oxygen concentration (at %) | Number of worn or cracked portions (evaluation) |
|---|---|---|---|---|
| Embodiment 1 | $1.2\times10^9$ | 0.05 | 3 | 0 (○) |
| Embodiment 2 | $1.2\times10^9$ | 0.7 | 10 | 1 (○) |
| Embodiment 3 | $1.2\times10^9$ | 0.7 | 17 | 3 (Δ) |
| Comparative example 1 | $8.8\times10^8$ | 0.05 | 3 | 8 (X) |
| Comparative example 2 | $1.2\times10^9$ | 1 | 100 | 12 (X) |

As indicated in Table 1, it has been found that the embodiments 1 to 3, which meet the condition of the master carrier of the present invention that $D_o>D_h$ and the adhesion between the substrate and the magnetic layer is $1.2\times10^9$ N/m$^2$ or greater, can be used even after magnetic transfer is performed 1000 times. It has also been found that the embodiments 1 and 2 in which the average oxygen concentrations are 3 at % and 10 at % are in a good state as the master carriers, because the number of worn or cracked portions are extremely small (0 or 1). On the other hand, in the comparative examples that do not meet the aforementioned conditions, the number of worn or cracked portions becomes 8 and 12 after magnetic transfer is performed 1000 times. Thus, it has been made clear that a large number of worn or cracked portions occur compared with the embodiments 1 to 3.

While the present invention has been described with reference to the preferred embodiments thereof, the invention is not to be limited to the details given herein, but may be modified within the scope of the invention hereinafter claimed.

What is claimed is:

1. A master carrier for magnetic transfer, comprising:

a substrate with a land/groove pattern comprising lands and grooves; and a magnetic layer formed on said land/groove pattern;

wherein adhesion between said substrate and said magnetic layer is $1.2\times10^9$ N/m$^2$ or greater;

and wherein a first oxygen concentration $D_o$ at said magnetic layer formed on said land is reduced gradually toward the direction of the depth of said substrate and is greater than a second oxygen concentration $D_h$ at said magnetic layer formed on said groove.

2. The master carrier as set forth in claim 1, wherein a surface on the magnetic layer side of said substrate is oxidized.

3. The master carrier as set forth in claim 1, wherein a ratio of said first oxygen concentration $D_o$ and said second oxygen concentration $D_h$, $D_h/D_o$, is in the range of 0.05 to 0.8.

4. The master carrier as set forth in claim 1, wherein an average oxygen concentration in said depth direction from said first oxygen concentration to said second oxygen concentration is 15 at % or less.

5. The master carrier as set forth in claim 1, wherein a ceramic layer is provided between said substrate and said magnetic layer.

6. The master carrier as set forth in claim 5, wherein a surface on the magnetic layer side of said substrate is oxidized.

7. The master carrier as set forth in claim 5, wherein a ratio of said first oxygen concentration $D_o$ and said second oxygen concentration $D_h$, $D_h/D_o$, is in the range of 0.05 to 0.8.

8. The master carrier as set forth in claim 5, wherein an average oxygen concentration in said depth direction from said first oxygen concentration to said second oxygen concentration is 15 at % or less.

9. A master carrier for magnetic transfer, comprising:

a substrate; and a pattern, provided on said substrate, which comprises a plurality of lands having a magnetic layer on at least the surface;

wherein the entire area of said magnetic layer is at least one of oxidized, nitrified, and carbonized, and the quantity of the at least one of oxidation, nitrification and carbonization on a surface side of said magnetic layer is greater than that of the at least one of oxidation, nitrification and carbonization for the entire layer.

10. The master carrier as set forth in claim 9, wherein the quantity of at least one of oxidation, nitrification and carbonization on the surface side of said magnetic layer is greater than the average quantity of the at least one of oxidation nitrification and carbonization for the entire magnetic layer.

11. A master carrier for magnetic transfer, comprising:

a substrate; and a pattern, provided on said substrate, which comprises a plurality of lands having a magnetic layer on at least the surface;

wherein at least a surface of said magnetic layer is the at least one of oxidized, nitrified, and carbonized, and the sum total of oxygen, nitrogen, and carbon in the at least one of oxidized portion, nitrified portion, and carbonized portion is in the range of 0.5 to 40 at% with respect to the quantity of all elements in said magnetic layer.

12. The master carrier as set forth in claim 11, wherein the sum total of oxygen, nitrogen, and carbon in the at least one of oxidized portion, nitrified portion, and carbonized portion is in the range of 1 to 30 at% with respect to the quantity of all elements in said magnetic layer.

* * * * *